United States Patent Office 3,417,878
Patented Dec. 24, 1968

3,417,878
VALVE FOR PNEUMATIC FLOATING MEANS
Max Schonfelder, Petit-Lancy, Geneva, Paul Zuppiger, Carouge, Geneva, and Gabriel Bouladon, Versoix, Geneva, Switzerland, assignors to Spencer (Melksham) Limited, Melksham, Wiltshire, England, a British company
Filed Apr. 12, 1967, Ser. No. 630,304
Claims priority, application Switzerland, Apr. 14, 1966, 5,589/66
19 Claims. (Cl. 214—1)

ABSTRACT OF THE DISCLOSURE

A valve for use in conveyors, floors and other surfaces over which loads are to be slidingly moved. The valves are so constructed that they automatically open when an object approaches them thereby to form or maintain between the object and the surface a thin film of fluid which supports the object and enables the object to move with very little frictional resistance. Once the object moves away from a valve, the latter closes automatically. The valves are pressure responsive and are constructed so as to be quick-acting and highly sensitive to pressure changes.

---

Figure 1:
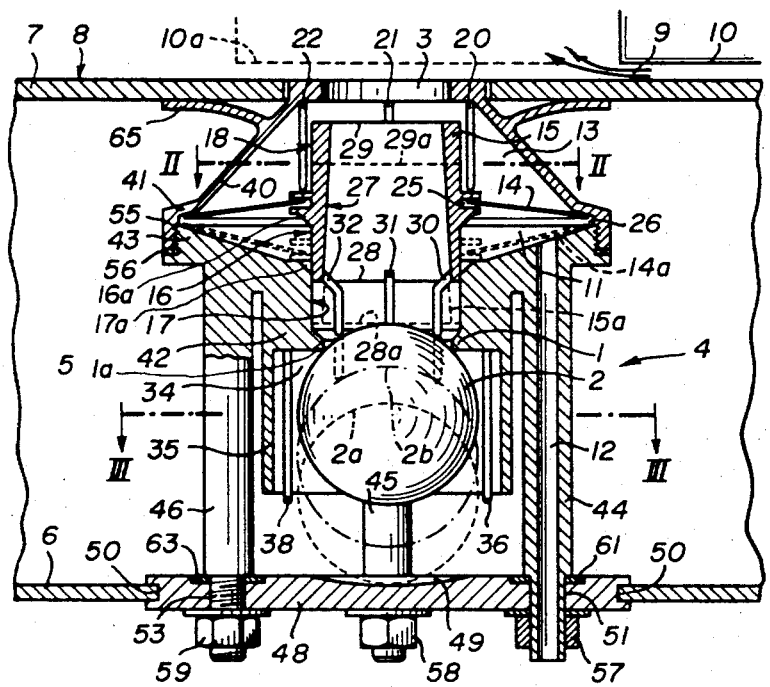

This invention relates to a valve for use in pneumatic floating means such as a pneumatic floating conveyor.

Pneumatic floating means are known. In this connection reference may for instance be made to British Patent No. 1,026,820. The arrangement disclosed in this patent comprises a bottom base structure which is delimited by a front wall and a black wall and which is supplied with fluid under pressure. The front wall is formed with a multiplicity of orifices and each orifice is controlled by a valve which only allows fluid under pressure to escape from the orifice when an object is near the orifice. The fluid escaping through these orifices forms between the object and the front wall a thin layer on which the object floats thus enabling the object to be moved without having to overcome frictional forces other than those exerted by this fluid layer.

The valves that are fitted in such a base structure must therefore be sensitive to the proximity of the objects that are to move along this front wall, otherwise the pneumatic floating system loses much of its interest because of the enormous fluid consumption that would occur should the orifices be permanently open, i.e. even in the absence of an object near the orifices.

Valves that are sensitive to the proximity of an object are known. In some constructional forms, a valve is merely associated with a proximity detector, each of these members retaining a readily recognizable identity within the arrangement. Such an arrangement is for instance described in U.S. Patent No. 3,081,886. In other constructional forms, these two devices are more intimately combined with some components of the combination being common to both devices. This is in particular the case with the arrangements that are described in British Patent No. 1,026,820 and which are the result of the combination of a proximity detector using a differential piston and of a slide valve. Solutions of this type have the advantage of leading to highly compact devices that are easy to manufacture and to install; but their operation is relatively sluggish and their sensitivity is not very high.

An object of the present invention is to provide a valve that is both very quick-acting and very sensitive. Broadly, the invention provides a valve suitable for controlling the supply of a fluid under pressure to an orifice in a surface relative to which objects are to be slidingly moved, the valve having a valve member arranged to be urged against a valve seat by the fluid, and control means for unseating the valve member when a said object is present at the orifice so as to supply the fluid to the object and for permitting re-seating of the valve member when the object is removed from the orifice, the control means including actuator means responsive to changes in fluid pressure at the orifice and arranged to unseat the valve member when the said pressure exceeds a predetermined value and further including a venturi for providing in a portion of the control means fluid pressure conditions which facilitate re-seating of the valve member when the pressure at the orifice falls below a predetermined value.

The invention further provides a valve for pneumatic floating means, comprising a body which includes a seat, an elongated housing portion, a recessed portion and an orifice, disposed seriatim along a common axis; a valve member for preventing in its closed position the outflow of a pneumatic floating fluid towards said orifice; and control means which include a sleeve-like member mounted for axial sliding movement in said elongated housing between a first position in which said sleeve-like member prevents said valve member from occupying its closed position and a second position in which said sleeve-like member leaves said valve member free to occupy its closed position, and a partition member which is arranged to accompany said sleeve-like member in the course of its axial displacements and which divides said recessed body portion into two mutually isolated chambers disposed one after the other along said common axis, with the first of said chambers, located nearer the seat, communicating with the atmosphere via a channel and the second of said chambers communicating with said orifice, said sleeve-like member having at the end thereof directed towards said orifice an internal diameter less than the diameter of said orifice thereby to form a venturi capable of setting up an underpressure in said second chamber whenever the velocity of throughflowing fluid exceeds a given value, and said partition member having an area such that said underpressure gives rise to a force capable of causing said sleeve-like member to slide to its second position and such that when the pressure in said second chamber exceeds a given value, said latter pressure gives rise to a force capable of causing said sleeve-like member to slide to its first position.

Figure 2:
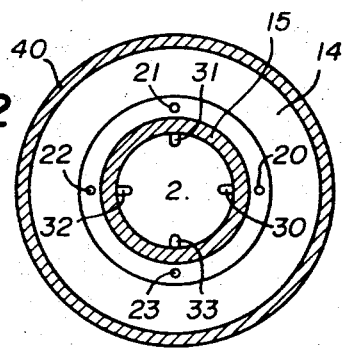
Figure 3:
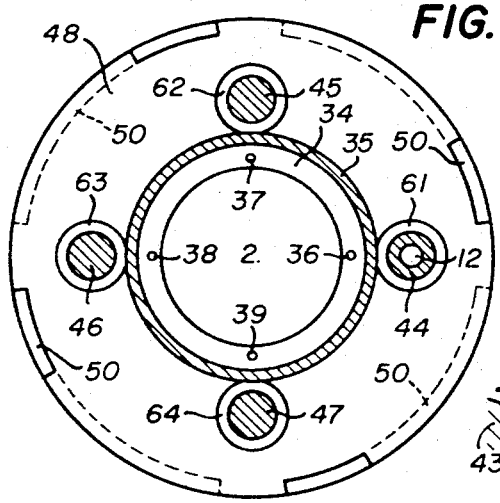
Figure 4:
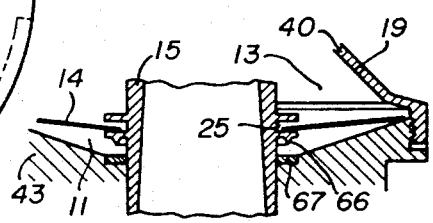

In the accompanying drawings:
FIGURE 1 is an axial section of a valve embodying the invention;
FIGURES 2 and 3 are cross-sections taken on lines II—II and III—III of FIGURE 1;
FIGURE 4 shows, in axial section, two variants of a portion of FIGURE 1.

The valve shown in FIGURE 1 comprises a seat 1, a valve member 2, an orifice 3 which are mounted in a body 4, the latter being itself fluidtightly secured to a rear wall 6 and a front wall 7 delimiting an enclosure 5 containing a gas under pressure, e.g. air. The top face 8 of front wall 7 defines the glide path of a pneumatic floating conveyor, similar to that described in the above referred to U.S. Patent No. 1,026,820, of which the base is formed by the enclosure 5 delimited by the hollow structure formed by walls 6 and 7, which base is elongated in the conveying direction and peppered with valves which are identical to that shown and which are intended to set up a gas film 9 for supporting a conveyed object or objects 10. That is why the orifice 3 is placed in the front wall of the enclosure 5 and is arranged flush with the glide path 8.

The valve additionally comprises a control device. The latter includes a first chamber 11, which communicates with the atmosphere through a channel 12, a second chamber 13, which is isolated from the first by a flexible fluidtight wall 14, and a control member 15 capable of moving axially of the seat 1. This control member assumes the form of a sleeve-like member whose outer surface comprises a first elongated cylindrical portion 16 which slides in a cylindrical housing 17 formed downstream of the seat 1, and a second cylindrical portion 18 which moves in an open-work cylindrical guide formed by longitudinally extending bars 20 to 23 secured to the periphery of the orifice 3 and arranged so as to keep this control member coaxial with the axis of the seat 1. The size of the first cylindrical portion 16 and of its housing 17 is such as to leave the least possible play while nevertheless providing the greatest possible freedom of movement to the sleeve-like member of which this first cylindrical portion forms part.

A groove 25 is formed between the two cylindrical portions 16 and 18. This groove is intended to receive the internal circumference of an annulus or washer made of thin rubber which forms the fluidtight flexible wall 14. This circumference has within this groove lateral and radial play so that the annulus does not exert any elastic stresses reaction on the sleeve-like member. The external circumference of this annulus is housed in a peripheral groove 26 in which it can also move freely without any elastic stresses. This annulus forms a deformable membrane capable of accompanying the sleeve-like member in the course of its axial displacements.

The control member 15 is formed with a bore 27 of which the inlet 28 has a diameter substantially equal to that of the seat 1 and of which the outlet 29 has a diameter less than that of the orifice 3. It is provided with legs 30 to 33 by means of which it can move the valve member 2 away from its closed position without, however, affecting the flow of gas through the seat 1.

The valve member 2, which assumes the form of a sphere, moves in a cylindrical chamber 34, termed stabilization chamber, provided upstream of the seat 1 and delimited by a skirt 35. Guides 36 to 39 prevent the valve member from moving away from a path coinciding with the axis of the seat 1, but allows this movement to take place freely.

The body 4 consists of three portions: an upper cover 40, in which is formed the orifice 3 and whose lower flange 41 forms the fixed wall of the second chamber 13; an intermediate part 42, in which are formed the elongated housing 16 for the control member, the seat 1 and the stabilization chamber 34, and whose flange 43, which forms the fixed wall of the first chamber 11, carries four stays 44 to 47 of which one, 44, is formed with a channel 12 for establishing communication between the first chamber 11 and the atmosphere; a lower cover 48, in which are formed a dished recess 49 for receiving the valve member 2 when the enclosure 5 is not pressurized, a quadruple helicoidal peripheral groove 50 to enable this lower cover to be fluidtightly secured by screwing in the rear wall 6 of the enclosure 5, and four holes 51 to 54 for receiving the ends of the stays 44 to 47.

The fixing of the upper cover 40 to the casing 42 is carried out by a screw thread 55, with a seal 56 ensuring the fluidtightness of chambers 11 and 13 in relation to the enclosure 5, and the fixing of the lower cover 48 on the ends of the stays 44 to 47 being ensured by nuts 57 to 60, and fluidtight seals 61 to 64.

The valve can thus be entirely assembled outside of the base structure and be fitted into place within the conveyor in a single operation by screwing the quadruple peripheral groove 50 into the rear wall 6, an elastic flange 65 being provided on the upper cover 40 to ensure fluidtightness at the front wall 7.

The above described valve operates as follows:

(a) When the conveyor is not in use, the gas within the enclosure 5 is at atmospheric pressure. The valve member 2 rests in the dished recess 49 as indicated by the broken line outline 2a, and the control member, under the action of its weight, rests via the lower lip of its groove 25 on the top end of the housing 17, this being indicated by the broken lines 15a, 28a, 29a, 14a. The valve is thus open. If, in the absence of an object 10, the gas within the enclosure 5 is pressurized, an outflow occurs through the seat 1, the bore 27 and the orifice 3. Since the diameter of the outlet 29 of the bore 27 is less than that of the orifice 3, there is set up, by a venturi effect, an underpressure within the second chamber 13. The pressure difference existing between the two faces of the flexible wall 14 (one face being subjected to the atmospheric pressure prevailing within chamber 11 and the other being subjected to the underpressure prevailing within the chamber 13) causes this wall to move upwards and to lift the control member 15. The valve member 2 is dragged by the gas current, which is stabilized by the stabilization chamber 34 to flow with cylindrical symmetry, and the drag applies the valve member against the seat 1 as indicated by the full line outline visible in FIGURE 1. The outflow then ceases and it is the static pressure of the gas upstream of the seat (i.e. within the enclosure 5) which maintains the valve member in its closed position. The gas flow having been interrupted, there is no longer any venturi effect, the pressure within chamber 13 becomes equal to the atmospheric pressure prevailing within chamber 11 and the control member rests on the valve member through the intermediary of legs 30 to 33. It will thus be observed that the valve automatically starts operating when the floating gas is pressurized.

(b) When a conveyed object 10 comes to be positioned over orifice 3 (in position 10a shown in broken lines), the pressure prevailing in the gas film 9 supporting this object is transmitted via orifice 3 to chamber 13. Since chamber 11 is at atmospheric pressure, the flexible wall 14 moves to position 14a and depresses the control member 15 to position 15a, which member moves the valve member 2 away from its seat to the open position 2b shown in chain-dotted lines. In this connection, the following forces act on the valve member: its weight, which tends to move it to its open position; the force due to the pressure prevailing in the gas film 9, which force acts in the same direction as the weight; the force due to the pressure prevailing within the enclosure 5, which force acts upwardly and tends to keep the valve member in its closed position; the force due to the difference in pressures prevailing on opposite sides of the flexible wall 14, which force is transmitted to the valve member by the control member 15 and the legs 30 to 33 and tends to move the valve member to its open position. The area of the flexible wall is so chosen that the resultant of these forces moves the valve member away from its seat to cause the valve to open. Communication is thus established, when an object is located near the valve, between the enclosure 5 and the region located between the glide path 8 and the object 10a, such communication furthering the existence of the supporting film 9 since the fluid escaping from the enclosure 5 through the open valve feeds the film 9. As soon as the object moves away, it is again an underpressure due to the venturi effect which is set up in chamber 13. The sleeve-like member is returned by the flexible membrane 14 to the position shown in full lines and the valve member is again pressed against its seat 1 by the pressure exerted by the fluid flowing through the stabilization chamber 34. The valve therefore closes again and will remain closed since chamber 13 will henceforth only be subjected to atmospheric pressure. It will thus be apparent that the valve reacts automatically to the arrival of a "floating" object.

(c) If an object comes to be laid on the glide path 8 opposite the valve, without having been brought there by floating, the air layer located beneath this object is progressively compressed since its escape path, the cross-section of which is given by the periphery of the object multiplied by the distance between the latter and the glide path 8, provides an increasing resistance to air flow. Consequently, before the object will have come into contact with the glide path, the valve will have opened and a supporting film will have formed beneath the object. The valve thus reacts automatically to the presence of a "nonfloating" object.

It will be seen that the above described valve is of the bistable type: its valve member can only occupy an open position or a closed position. It occupies a closed position when there is no object in its vicinity, and an open position when an object is present, whether this object has come to be located near the valve by pneumatic floating along the glide path 8 or has been laid vertically on the latter. This valve is very quick-acting because all of its movable components are very light and it is very sensitive thereby enabling it to be installed in a low pressure pneumatic floating conveyor. Further it combines in the same arrangement a valve as such and a proximity detector controlling the opening and closure of the valve.

It is in order to increase this sensitivity that the rubber annulus or washer is mounted with radial and axial play in the grooves 25 and 26. In this way, it is not subjected to elastic stresses other than a very slight bending near the grooves 25 and 26. Despite this loose mounting, the fluidtightness between the chambers 11 and 13 is sufficient, the difference between the pressures prevailing within each of the latter being sufficiently marked to apply the membrane against the lips of the grooves.

The invention provides, by way of variant, forming on the lower lip of the groove formed on the control member 15 a circular rib 66 and fitting a seal 67 at the top portion of the guide housing 17. This arrangement has the advantage of preventing any leaks between the cylindrical portion 16 of the control member 15 and the elongated housing 17 when the control member is in an open position and provides greater freedom to the axial movement of the sleeve-like member without affecting fluidtightness.

Another variant consists in establishing between the enclosure 5 and the space lying between the seat 1 and the orifice 3 a communication of minimal throughflow to enable a very small, continuous leakage of gas from the enclosure. This communication can consist of a hole 19 (FIGURE 4) made in the upper cover 40, or of a sealing defect in the seat 1 (for instance a groove 1a in the seat (FIG. 1) or a groove in the valve member, or a flat on the valve member, or a roughness of the valve member surface). Thus, even if the valve member 2 is in a closed position, there will always be set up, when the orifice is obstructed by an object, a progressive overpressure within the second chamber 13, such overpressure causing, after a certain length of time, the control member 15 to move to its open position. Thus even when laying an object very lightly on the glide path or when sliding the object without a supporting film, the valve will be caused to open.

In the valve illustrated in FIGURE 1, the sleeve-like member 15 of the control means is guided by the elongated housing 17, in which slides the cylindrical portion 16, and by the open-work guide which is formed by the ribs 20 to 23 and in which slides the cylindrical portion 18. This open-work guide, in which the openings should be as large as possible so as not to interfere with the communication between the second chamber 13 and the orifice 3, is however not essential and, in some cases, the cylindrical portion 18 together with the associated open-work guide may be dispensed with.

It is also possible to replace the flexible membrane 14 by a rigid element retained on or solid with the sleeve-like member. The recessed portion of the valve body defining the two chambers must then be cylindrical to enable the rigid element to slide therein. Fluidtightness between the two chambers is however more difficult to achieve.

Of the means for ensuring fluidtightness, in the lower-most position (shown in broken lines in FIGURE 1) of the control member, between the elongated housing and the first chamber, those described with reference to FIGURE 4 are only one possibility among many. For instance, it is conceivable that a circular rib similar to rib 66 (FIGURE 4) should be provided at the upper end portion of the elongated housing 17 (i.e. the end facing the orifice 3) and that the seal 67 should be carried by the control member 15. This fluidtightness may also be ensured by providing the control member with a conical surface 16a (FIG. 1) occupying, for instance, the place of the rib 66, and by providing the end of the housing 17 with a conical chamfer 17a (FIG. 1) with which the conical surface is adapted to cooperate.

It may be of advantage to replace the dished recess 49 formed in the lower cover by a boss on which the valve member may sit when moved away from its closed position. This boss lies axially of the seat and its height is so selected that the valve member may not escape from the stabilization chamber 34. This arrangement has the advantage of preventing foreign body particles, such as coarse dust, from accidentally settling beneath the valve member and from hindering its operation.

The supply of fluid under pressure can clearly be achieved in any suitable manner. In the above-described embodiments, there is a common supply, via the enclosure 5, for all valves associated with this enclosure. The valves may however be supplied if desired individually or in groups.

As stated earlier, the valves provided by the present invention are particularly well-suited for use in the glide paths of pneumatic floating conveyors. The expression "pneumatic floating conveyor" is used in a very broad sense and is meant to include any surface over which loads are to be moved through the intermediary of a film of fluid. Suitable surfaces are for instance provided by guillotine shearing tables, press tables (for positioning sheets of metal, cardboard, plastic material, etc.) stone cutting and/or polishing machine tables, palleting tables, tables for handling stacks of paper or of cardboard in the paper industry, lorry, aircraft or ship decks (for handling loads on and off these vehicles), storerooms and warehouse floors (for moving packages thereacross), turntables (for conveyors, monorails transporters, etc.). This expression is also meant to include channels having lateral guide walls in which valves such as those described are mounted to set up a buffer layer of fluid whereby objects conveyed along the channels are prevented from abutting these side walls abruptly. Such installations have been found to be especially useful for handling bagged materials, in particular in those locations where moving bags have to undergo a change in direction. As will be observed, the valves that are provided by the present invention have multiple applications in a most varied range of fields.

We claim:

1. A valve suitable for controlling the supply of a fluid under pressure to an orifice in a surface relative to which objects are to be slidingly moved, the valve having a valve member arranged to be urged against a valve seat by the fluid, and control means for unseating the valve member when a said object is present at the orifice so as to supply the fluid to the object and for permitting re-seating of the valve member when the object is removed from the orifice, the control means including actuator means responsive to changes in fluid pressure at the orifice and arranged to unseat the valve member when the said pressure exceeds a predetermined value and further including a venturi for providing in a portion of the control means fluid pressure conditions which facilitate re-seating of the valve member when the pressure at the orifice falls below a predetermined value.

2. A valve for pneumatic floating means, comprising a body which includes a seat, an elongated housing portion, a recessed portion and an orifice, disposed seriatim along a common axis; a valve member for preventing in its closed position the outflow of a pneumatic floating fluid towards said orifice; and control means which include a sleeve-like member mounted for axial sliding movement in said elongated housing between a first position in which said sleeve-like member prevents said valve member from occupying its closed position and a second position in which said sleeve-like member leaves said valve member free to occupy its closed position, and a partition member which is arranged to accompany said sleeve-like member in the course of its axial displacements and which divides said recessed body portion into two mutually isolated chambers disposed one after the other along said common axis, with the first of said chambers, located nearer the seat, communicating with the atmosphere via a channel and the second of said chambers communicating with said orifice, said sleeve-like member having at the end thereof directed towards said orifice an internal diameter less than the diameter of said orifice thereby to form a venturi capable of setting up an underpressure in said second chamber whenever the velocity of through-flowing fluid exceeds a given value, and said partition member having an area such that said underpressure gives rise to a force capable of causing said sleeve-like member to slide to its second position and such that when the pressure in said second chamber exceeds a given value, said latter pressure gives rise to a force capable of causing said sleeve-like member to slide to its first position.

3. A valve according to claim 2, wherein said partition member consists of an annular flexible membrane having an inner circumferential portion held by first retaining means on said sleeve-like member and having an outer circumferential portion held by second retaining means on the peripheral wall of said recessed body portion, at least one of said retaining means being adapted to eliminate the elastic reaction of said membrane on said sleeve-like member.

4. A valve according to claim 3, wherein said first retaining means consists of a circular groove formed on the periphery of said sleeve-like member, said groove having a width and a depth such that the inner circumferential portion of said membrane is loosely held therein.

5. A valve according to claim 3, wherein said second retaining means consists of a circular groove formed on peripheral wall of said recessed body portion, said groove having a width and a depth such that the outer circumferential portion of said membrane is loosely held therein.

6. A valve according to claim 2, further comprising sealing means for preventing, at least when said sleeve-like member is located in said first position, fluid flow from said elongated housing portion to said first chamber.

7. A valve according to claim 6, wherein said sealing means comprises a first circular conical surface formed along the end portion of said elongated housing portion opposite said orifice and a second circular conical surface adapted to cooperate with said first circular conical surface and formed around said sleeve-like member.

8. A valve according to claim 6, wherein said sealing means comprises a circular rib element and a cooperating element providing a circular surface engageable by said circular rib element, one of said elements being located along the end portion of said elongated housing portion opposite said orifice and the other of said elements being located around said sleeve-like member.

9. A valve according to claim 2, wherein said second chamber comprises cylindrical guide means adapted to cooperate with a portion of said sleeve-like member adjacent said orifice, said cylindrical guide means providing a passage to maintain communication between said second chamber and said orifice.

10. A valve according to claim 2, further comprising a communication of small cross-section which connects a space upstream of said valve member with said second chamber, said communication having a cross-section such as to give rise to a minimal fluid leakage, said leakage permanently providing said second chamber with a small quantity of fluid under pressure.

11. A valve according to claim 10, wherein said communication consists of a passage which directly connects said upstream space with said second chamber and bypasses said seat.

12. A valve according to claim 10, wherein said communication consists of a surface imperfection in at least one of said valve member and said seat, said surface imperfection defining a channel which indirectly connects, in the closed position of said valve member, said upstream space with said second chamber through said sleeve-like member.

13. A valve according to claim 12, wherein said seat is formed with at least one groove to provide said surface imperfection.

14. A valve according to claim 2, wherein said valve member is a light weight ball.

15. A valve according to claim 2, wherein said body further includes a stabilization chamber upstream of said seat and coaxial therewith, said stabilization chamber having a length and a diameter such as to produce, in the open position of said valve member, a throughflow of cylindrical symmetry capable of exerting on said valve member a force tending to return said valve member to its closed position, and wherein guide means are provided to impart to said valve member an axial displacement in relation to said seat when returning to said closed position.

16. A valve according to claim 15, wherein said body further includes a recess in which said valve member is adapted to rest in its open position, said recess lying on said common axis and having a height such as to prevent said valve member from escaping from said stabilization chamber.

17. A valve according to claim 16, wherein said first end part comprises a resilient circumferential flange and said second end part comprises fluidtight mounting means for mounting said valve in a hollow base of pneumatic floating means, said base including a front wall, which provides a floating surface, and a back wall and defining a chamber adapted to be supplied with fluid under pressure, said front wall being formed with a first opening for accommodating said first end part whereby said orifice will lie substantially flush with said floating surface and said back wall being formed with a second opening for accommodating said second end part, said fluidtight mounting means being adapted to press said resilient flange into fluidtight engagement with the inner surface of said front wall to prevent fluid under pressure to issue directly from said chamber through said first opening and said fluidtight mounting means preventing fluid under pressure to issue from said chamber through said second opening.

18. A valve according to claim 15, wherein said body is made up of an intermediate part in which are formed said stabilization chamber with the guide means for the valve member, said seat, said elongated housing portion, and at least the portion of said recessed portion defining said first chamber, and which further includes at least three stays extending parallel to said common axis away from said seat and beyond said stabilization chamber of which at least one is formed with said channel for establishing communication between said first chamber and the atmosphere, is made up of a first end part in which are formed said orifice and the remainder of said recessed portion, and which further includes mounting means for mounting said first end part on said intermediate part, and is made up of a second end part in which are formed at least three holes for receiving the free end portions of said stays, whereby assembly of said valve is achieved by introducing said sleeve-like member into said elongated housing portion and said partition member, fitted on said sleeve-like member, in said recessed portion, by mounting said first end part on said intermediate part, and by fitting into place said second end part with the free end portions of said stays extending fluid-tightly through the holes formed in said second end part, the clearance between said second end part and said stabilization chamber defining the valve inlet.

19. A valve according to claim 2, wherein said sleeve-like member has at least one leg by means of which said sleeve-like member, when located in said first position, acts on said valve member.

References Cited
UNITED STATES PATENTS

| | | | |
|---|---|---|---|
| 1,139,455 | 5/1915 | Gase | 137—508 X |
| 2,623,331 | 12/1952 | Greening | 137—508 X |
| 3,081,886 | 3/1963 | Flexman et al. | 214—1 |
| 3,257,964 | 6/1966 | Conners | 302—29 X |
| 3,279,863 | 10/1966 | Bouladon et al. | 302—29 |

EVON C. BLUNK, *Primary Examiner.*

M. L. AJEMAN, *Assistant Examiner.*

U.S. Cl. X.R.

137—508; 302—31